United States Patent
Chiffot

(10) Patent No.: US 10,520,620 B2
(45) Date of Patent: Dec. 31, 2019

(54) METHOD AND APPARATUS FOR ESTIMATING SURFACE WAVE CODA USING TIME-REVERSAL EXPERIMENTS

(71) Applicant: CGG SERVICES SAS, Massy (FR)

(72) Inventor: Corentin Chiffot, Dijon (FR)

(73) Assignee: CGG SERVICES SAS, Massy (FR)

( * ) Notice: Subject to any disclaimer, the term of this patent is extended or adjusted under 35 U.S.C. 154(b) by 336 days.

(21) Appl. No.: 15/485,267

(22) Filed: Apr. 12, 2017

(65) Prior Publication Data

US 2017/0299741 A1    Oct. 19, 2017

Related U.S. Application Data

(60) Provisional application No. 62/321,767, filed on Apr. 13, 2016.

(51) Int. Cl.
*G01V 1/28* (2006.01)
*G01V 1/36* (2006.01)
*G01V 1/00* (2006.01)

(52) U.S. Cl.
CPC ............... *G01V 1/282* (2013.01); *G01V 1/36* (2013.01); *G01V 1/003* (2013.01); *G01V 2210/53* (2013.01); *G01V 2210/614* (2013.01); *G01V 2210/679* (2013.01)

(58) Field of Classification Search
CPC .... G01V 2210/614; G01V 1/003; G01V 1/30; G01V 2210/6161
See application file for complete search history.

(56) References Cited

U.S. PATENT DOCUMENTS

| | | | |
|---|---|---|---|
| 8,417,458 B2 | 4/2013 | Halliday et al. | |
| 8,441,890 B2 | 5/2013 | Halliday et al. | |
| 9,674,711 B2* | 6/2017 | Bennett | H04B 7/022 |
| 2014/0244179 A1* | 8/2014 | Van Manen | G01V 1/003 702/17 |

FOREIGN PATENT DOCUMENTS

WO    2015108862 A1    7/2015

OTHER PUBLICATIONS

Arnaud Derode et al., Recovering the Green's function from field-field correlations in an open scattering medium (L), J. Acoust. Soc. Am., Jun. 2003, pp. 2973-2976, vol. 113, No. 6.
N.M. Shapiro et al., "Emergence of broadband Rayleigh waves from correlations of the ambient seismic noise", Geophysical Research Letters, 2004, p. L07614, vol. 31.

(Continued)

*Primary Examiner* — Elias Desta
(74) *Attorney, Agent, or Firm* — Patent Portfolio Builders PLLC

(57) ABSTRACT

Surface wave coda in seismic data recorded with a data acquisition system over an underground formation is estimated using time-reversal experiments. First time-reversal experiments use a first time-reversal mirror including a target source and one or more other sources to obtain estimates of surface waves traveling from other receivers to a target receiver. Second time-reversal experiments obtain a coda estimate for a surface wave traveling from the target source to the target receiver using a second time-reversal mirror including the target receiver and the other receivers.

20 Claims, 5 Drawing Sheets

(56) References Cited

OTHER PUBLICATIONS

Nikolai M. Shapiro et al., "High-Resolution Surface-Wave Tomography from Ambient Seismic Noise", Science, Mar. 11, 2005, pp. 1615-1618, vol. 307.
Extended European Search Report received in corresponding Application No. 17305424.8-1559, dated Aug. 2, 2017.
H. Yao et al., "Surface-wave array tomography in SE Tibet from ambient seismic noise and two-station analysis—I. Phase velocity maps," Geophysical Journal International, vol. 166, Mar. 30, 2006, pp. 732-744.

* cited by examiner

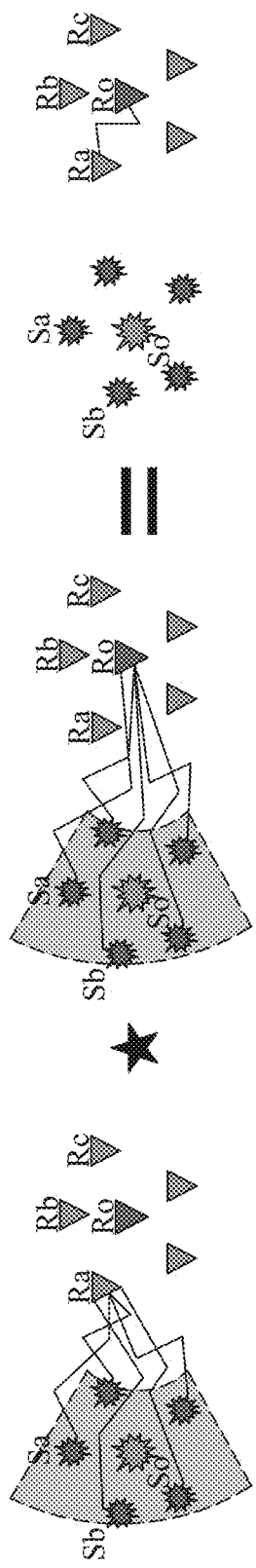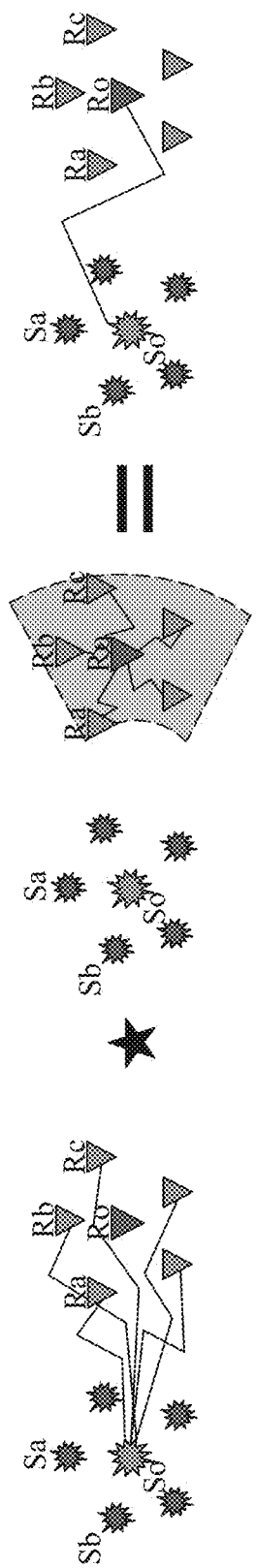

METHOD AND APPARATUS FOR ESTIMATING SURFACE WAVE CODA USING TIME-REVERSAL EXPERIMENTS

CROSS-REFERENCE TO RELATED APPLICATIONS

The present application is related to and claims the benefit of priority of U.S. Provisional Application 62/321,767 filed Apr. 13, 2016, the entire content of which is incorporated herein by reference.

BACKGROUND

Technical Field

Embodiments of the subject matter disclosed herein generally relate to methods and systems for seismic data processing, and, in particular, to estimating surface wave coda from the seismic data recorded with a data acquisition system over an underground formation.

Discussion of the Background

In the oil and gas industry, seismic surveys are used to probe underground formations in search of hydrocarbon reservoirs. FIG. 1 is a schematic diagram of a land seismic data acquisition system 100. The time of arrival and amplitude of seismic waves reflected by layer interfaces inside the underground formation allow generation of an image of the underground formation.

Seismic sources (e.g., vibrators) are carried by trucks and placed at planned shooting positions along lines 110a-f. The vibrators are sources generating a relatively low amount of seismic energy. Explosions or even earthquakes (known as "impulsive sources" because energy is released in far shorter time intervals than, for example, in the case of vibrators) are high-energy wave sources with deeper penetration, but are less practical for obvious reasons. Surface waves traveling from a source to a receiver without being reflected by a layer interface inside the explored underground formation are proportional to the emitted seismic energy: the higher the amount of emitted energy, the stronger and farther the surface waves travel.

Receivers (e.g., hydrophones, geophones and/or accelerometers) along receiver lines 120a-e detect seismic waves caused by the vibrators and noise, which are recorded as seismic data. The distances between the receiver lines, $D_R$, between the shooting lines, $D_S$, between adjacent shooting positions, $d_S$, and between adjacent receivers, $d_R$, are survey design parameters. FIG. 1 shows parallel receiver lines on an ideal flat surface intersected by shot lines perpendicular to the receiver lines. The "parallel" and "perpendicular" characteristics and regular distances $D_R$, $D_S$, $d_S$, and $d_R$ are ideal, but not a limitation. In fact, local particularities in the surveyed area have to be taken into consideration in the survey design, resulting in a substantially more complex arrangement of receivers and shot positions (called "data acquisition geometry").

As easily ascertainable, land seismic data measured on a complex near-surface layer contains surface waves with a strong coda due to multiple shallow scatterers (e.g., buried heterogeneities). Coda is the late part of a surface wave traveling from a seismic source to a receiver, and it is due, for example, to multiple scattering. It is useful to isolate this surface wave coda in order to obtain information about the near-surface layer or to remove coda from seismic data before seeking structural information about the underground formation.

Traditionally, coda was removed by time-gating the detected seismic data. More complex approaches have recently been developed. For example, the Shapiro et al.'s articles ("Emergence of broadband Rayleigh waves from correlations of the ambient seismic noise," published in *Geophysical Research Letters,* 31, L0761, 2004, and "High-resolution surface-wave tomography from ambient seismic noise," published in *Science,* 307, pp. 1,615-1,617, 2005, the entire contents of which are incorporated herein by reference) describe methods using time-gating and coda correlations to estimate surface wave coda between receiver stations.

However, conventional methods are limited by data acquisition geometry. The surface wave coda is estimated on a geometry different from that of the actual data acquisition system, making it necessary to apply spatial interpolation or other similar corrective technique before subtracting (e.g., using adaptive subtraction) the coda obtained with the conventional methods from the seismic data.

Thus, there is a need for methods and systems that overcome the above-described drawbacks and limitations of conventional methods.

SUMMARY

Methods and devices according to various embodiments obtain surface wave coda using time-reversal experiments for time-reversal mirrors, including sources and receivers of the data acquisition system used to acquire seismic data. The coda estimate is then used to obtain information about a near-surface layer and/or removed coda from the seismic data before processing to extract structural information about the underground formation.

According to an embodiment, there is a method for estimating surface wave coda in seismic data recorded with a data acquisition system over an underground formation. The method includes defining a first time-reversal mirror including a target source and one or more other sources of the data acquisition system, and a second time-reversal mirror including a target receiver and one or more other receivers of the data acquisition system. The method further includes using the first time-reversal mirror to simulate first time-reversal experiments on an input dataset representative for the seismic data, to obtain estimates of surface waves traveling from the other receivers to the target receiver. The method then includes muting each of the estimates and each surface wave trace from the target source to one of the other receivers in the second time-reversal mirror, up to a respective coda start time, to obtain a computed coda dataset, and using the second time-reversal mirror to simulate second time-reversal experiments on the computed coda dataset, to obtain a coda estimate for a surface wave travelling from the target source to the target receiver.

According to another embodiment, there is a data processing apparatus configured to estimate surface wave coda in seismic data recorded with a data acquisition system over an underground formation. The apparatus includes an interface configured to obtain the seismic data, and a data processing unit connected to the interface. The data processing unit is configured to define a first time-reversal mirror including a target source and one or more other sources, and a second time-reversal mirror including a target receiver and one or more other receivers, to use the first time-reversal mirror to simulate first time-reversal experiments on an input dataset representative for the seismic data, to obtain estimates of surface waves traveling from the other receivers to the target receiver, to mute each of the estimates and each surface wave trace from the target source to one of the other receivers in the second time-reversal mirror, up to a respective coda, to obtain computed coda dataset, and to use the second time-reversal mirror to simulate second time-reversal experiments on the computed coda dataset, to obtain a coda estimate for a surface wave travelling from the target source to the target receiver.

According to yet another embodiment, there is a non-transitory computer-readable media storing executable codes which, when executed by a processor, make the processor perform a method for estimating surface wave coda in seismic data recorded with a data acquisition system over an underground formation. The method includes defining a first time-reversal mirror including a target source and one or more other sources of the data acquisition system, and a second time-reversal mirror including a target receiver and one or more other receivers of the data acquisition system. The method further includes using the first time-reversal mirror to simulate first time-reversal experiments on an input dataset representative for the seismic data, to obtain estimates of surface waves traveling from the other receivers to the target receiver. The method then includes muting each of the estimates and each surface wave trace from the target source to one of the other receivers in the second time-reversal mirror, up to a respective coda start time, to obtain a computed coda dataset, and using the second time-reversal mirror to simulate second time-reversal experiments on the computed coda dataset, to obtain a coda estimate for a surface wave travelling from the target source to the target receiver.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 is an illustration of first time-reversal experiments according to an embodiment;

FIG. 5 is an illustration of first time-reversal experiments according to an embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of land seismic surveys. However, the inventive concepts to be discussed next are not limited to land seismic surveys, but may also be applied for ocean bottom marine surveys and surveys with electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Seismic surveys are used to explore underground formations, that is, to learn about various layers of thickness and properties as seismic waves are reflected and refracted at layer interfaces. Here, a layer is considered a volume with substantially similar physical properties, e.g., substantially the same seismic wave propagation velocity throughout. Seismic data acquired during surveys is processed to extract information about the underground formation beneath the survey area. It is, therefore, important to have high-quality tools for processing the seismic data in order to extract a highly accurate structural image of the surveyed underground formation, to ascertain the presence of mineral resources and/or hydrocarbons reservoirs. Seismic data processing is a technological process that those skilled in the art continuously improve. The embodiments described in this section represent efforts for improving seismic data processing to generate images of underground formations. A better coda enables both learning more about an upper layer of the underground formation, and removing from the seismic data corrupting artifacts due to this upper layer, which is then used for extracting structural information about the deeper layers of the formation.

Figure 1:
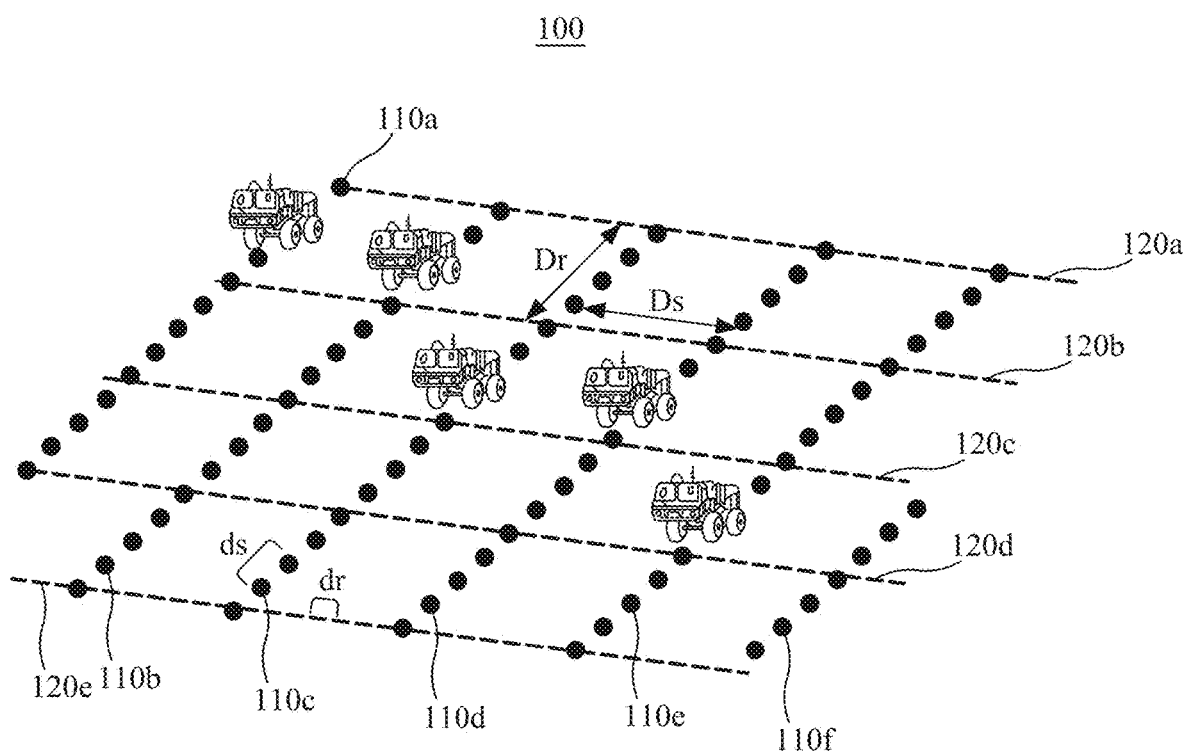
FIG. 1 is a schematic diagram of a land seismic data acquisition system.
Figure 2:
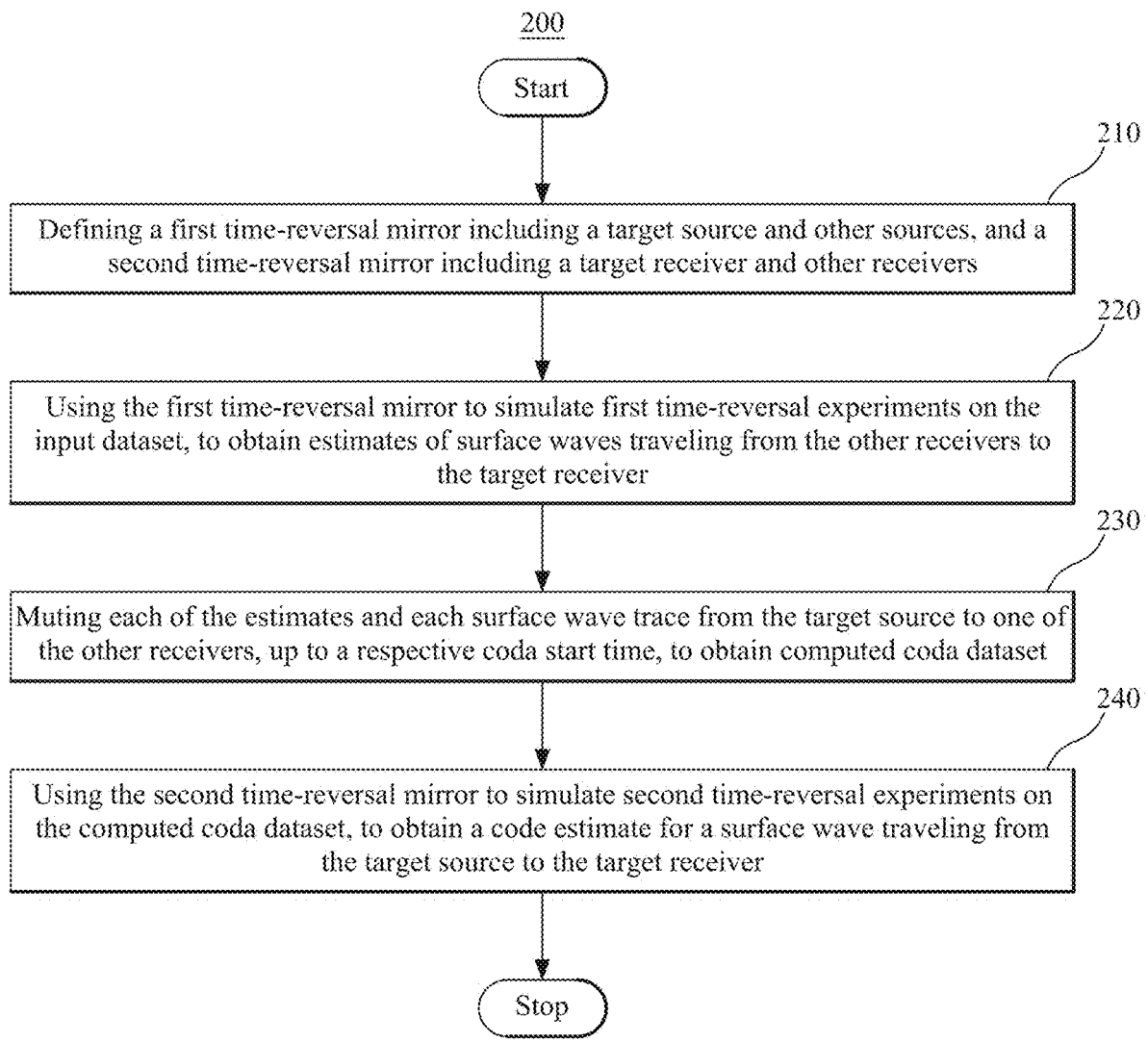
FIG. 2 is a flowchart of a method according to an embodiment.

FIG. 2 is a flowchart of a method 200 for estimating surface wave coda in seismic data recorded with a data acquisition system (such as the one illustrated in FIG. 1) over an underground formation. Some terms used to characterize this method's steps are first explained.

A "time-reversal experiment" is a technique of cross-correlating measured wave fields to obtain a Green function between two passive receivers (i.e., an estimation of a surface wave reaching one receiver as if it has been emitted from the other receiver). This technique is described in the 2003 article, "Recovering the Green's function from field-field correlations in an open scattering medium (L)," by A. Derode et al., published in *The Journal of the Acoustical Society of America*, 113(6), pp. 2,973-2,976, the entire content of which is incorporated herein by reference. A "time-reversal mirror" refers to a set of sources or receivers used for wave field cross-correlation in a time-reversal experiment.

Further, the term "input dataset" is used for a subset of the originally acquired seismic data that includes both surface waves and seismic waves reflected from layer interfaces inside the underground formation. In this subset (i.e., the input dataset), the surface waves are approximately isolated (for example, other waves emerging from locations deeper within the underground formation arriving later then the surface waves are muted). Some pre-processing (for example, noise reduction) may also have been applied to this input dataset.

Returning now to FIG. 2, method 200 includes defining a first time-reversal mirror including a target source and one or more other sources, and a second time-reversal mirror including a target receiver and one or more other receivers at 210. The sources and receivers in the first and second time-reversal mirrors pertain to the data acquisition system.

Figure 3:
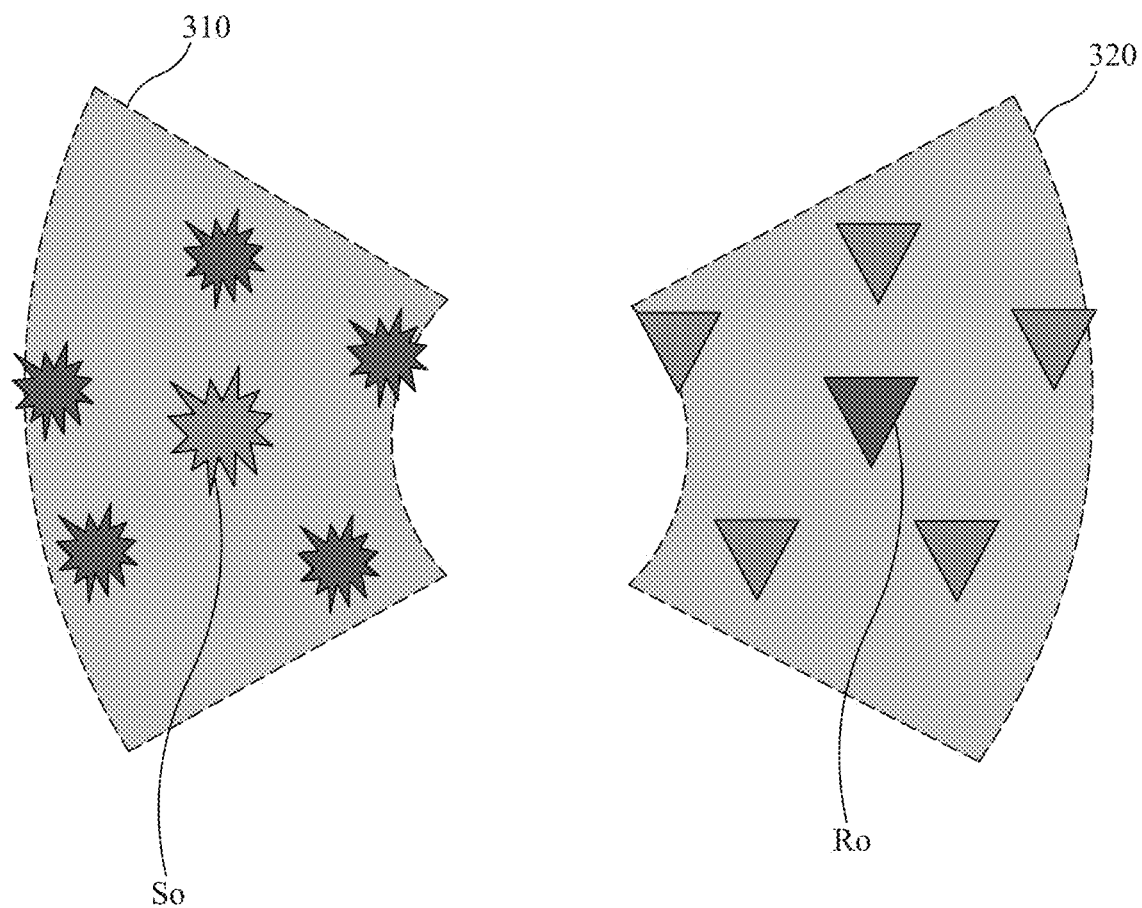
FIG. 3 is an illustration of time-reversal mirrors according to an embodiment.

FIG. 3 illustrates the first time-reversal mirror 310 including the target source So, and the second time-reversal mirror 320 including the target receiver Ro according to an embodiment. The sources other than the target source in the first time-reversal mirror and the receivers other than the target receiver in the second time-reversal mirror may be selected to be within a maximum predetermined distance from the target source and the target receiver, respectively. This maximum predetermined distance may be determined based on the emitted seismic source energy, in view of the inherent surface wave attenuation while traveling through the top layer of the formation. The number and arrangement of the sources and receivers in FIG. 3 is an illustration not intended to be limiting.

The maximum distance criterion is only one way of selecting the sources of the first time-reversal mirror and the receivers of the second time-reversal mirror. Another way employs a frequency-dependent maximum distance (e.g., if processing is done separately for multiple frequency bands). In one embodiment, all sources and/or receivers may be considered (if the computing resources do not limit the number of source and/or receivers considered). In yet another embodiment, sources/receivers that are expected to provide a significant contribution to the next sum are considered (e.g., the sources/receivers are close to the assumed/estimated surface-wave ray), or to provide a contribution with a high signal-noise ratio. In a broad view, at least one other source and/or at least one other receiver are present in the first or second time-reversal mirror, respectively.

Method 200 further includes using the first time-reversal mirror to simulate first time-reversal experiments on the input dataset, to obtain estimates of surface waves traveling from the other receivers to the target receiver, at 220. A first time-reversal experiment is simulated for each receiver using the sources in the first time-reversal mirror. As illustrated in FIG. 4, in such a first time-reversal experiment, a surface wave trace between a source Sx (x=a, or b, or c, etc.) and a receiver Ra in FIG. 4 of the second time-reversal mirror is correlated (as suggested by "*" in FIG. 4) with the surface wave trace between the source Sx and the target receiver Ro. The surface wave traces are symbolically represented as jagged lines connecting the indicated elements (source to receiver). Thus, the surface wave trace between Sa and Ra is correlated with the surface wave trace between Sa and Ro, the surface wave trace between Sb and Ra is correlated with the surface wave trace between Sb and Ro, etc.

For example, the surface wave traces used at 220 may be extracted from the seismic data in the following manner. A geophysicist identifies surface waves for some locations by visual inspection, manually picking start/end times of the surface waves. Generic mute laws may then be derived based on these manual pickings. If the inspected/manually picked portions are representative of the diversity of propagation conditions, applying the generic mute laws yields a reasonable separation of the surface waves for the whole dataset.

FIG. 4 actually represents the sum of the correlations for all the sources of the first time-reversal mirror that yields (as suggested by "=") an estimation of a surface wave reaching target receiver Ro as if it has been emitted by receiver Ra of the second time-reversal mirror. The same correlations and summation are performed for all the receivers (Rb, Rc, etc.) in the second time-reversal mirror to obtain estimates of surface waves traveling to the target receiver from all the other receivers in the second time-reversal mirror.

Method 200 then includes muting each of the estimates and each surface wave trace from the target source to the receivers in the second time-reversal mirror, up to a respective coda start time, to obtain a computed coda dataset, at 230.

The muting of any of these surface waves may be performed as now described. For each surface wave, a coda start time is determined based on the distance between the wave's originating location (source or receiver) and the respective receiver. For example, the distance used to determine the start coda time for the estimate of surface waves traveling from Ra to Ro is the length of a straight line from Ra to Ro, and the distance used to determine start coda time for the target source So to receiver Ra is the straight line from So to Ra. Using the distance between the two elements (source and/or receiver) is not the only method to determine the start coda time. For example, the start coda time may also be picked by visual inspection of the traces.

The respective surface wave is then muted up to the respective start coda time, to retain only the respective coda. In other words, values along the trace are zeroed up to the start coda time.

The muting is performed for the surface wave estimates between Ra and Ro, between Rb and Ro, between Rc and Ro, etc., and for the measured surface waves (i.e., extracted from the input dataset) between So and Ra, between So and Rb, etc. The muting of the estimates and the surface waves yields a computed coda dataset.

Method 200 then includes using the second time-reversal mirror to simulate second time-reversal experiments on the computed coda dataset, to obtain an estimate of the coda from the target source to the target receiver, at 240. A second time-reversal experiment is simulated for each receiver in the second time-reversal mirror. As illustrated in FIG. 5, for a receiver Rx (with x=a, b, c, etc.) of the second time-reversal mirror, a surface wave coda between this receiver Rx and the target source So is correlated (*) with the surface wave coda between the receiver Rx and the target receiver Ro. Thus, the surface wave coda between So and Ra is correlated with the surface wave coda between Ra and Ro, the surface wave coda between So and Rb is correlated with the surface wave coda between Rb and Ro, etc. The sum of these correlations yields (=) the coda of the surface wave from the target source So to the target receiver Ro.

Method 200 is described for one source and receiver pair, but it may be performed for plural (even all) source-receiver pairs in the data acquisition system.

The advantage of the approach set forth above is that surface wave coda can be estimated for any data acquisition geometry in a two-dimensional (2D) arrangement, a three-dimensional (3D) arrangement, cross-spread, etc. Here the term "cross-spread" refers to a portion of a 3D survey related to one approximately straight line of sources approximately perpendicular to one approximately straight line of receivers. Thus, a 3D survey may be seen as a collection of cross-spreads. The term "cross-spread" may also be used to indicate the sources/receivers that constitute this cross-like portion, or the dataset restricted to these sources/receivers. Splitting a dataset into cross-spreads is useful because it splits the huge dataset into small chunks of manageable data size (just one line of sources and one line of receivers), so it is much faster to process than the whole dataset, and may be processed entirely in fast memory (RAM) instead of using hard disk (slower). Since a cross-spread is made of one line of sources and one line of receivers, these chunks retain a minimal spacing between sources, and a minimal spacing between receivers. Therefore, spatial aliasing is minimal when looking at/processing the cross-spread data.

The methods according to various embodiments described in this section estimate the surface wave coda for the same geometry as the input data set, i.e., the estimated coda is related to the surface waves propagating between the same sources and receivers as the ones used to acquire the seismic data. Therefore, the output of these methods (i.e., the sum of coda corresponding to one or more pairs of target source and target receiver) can be used directly in further processing (e.g., adaptive subtraction from the seismic data) without spatial interpolation or other approximations.

Figure 6:
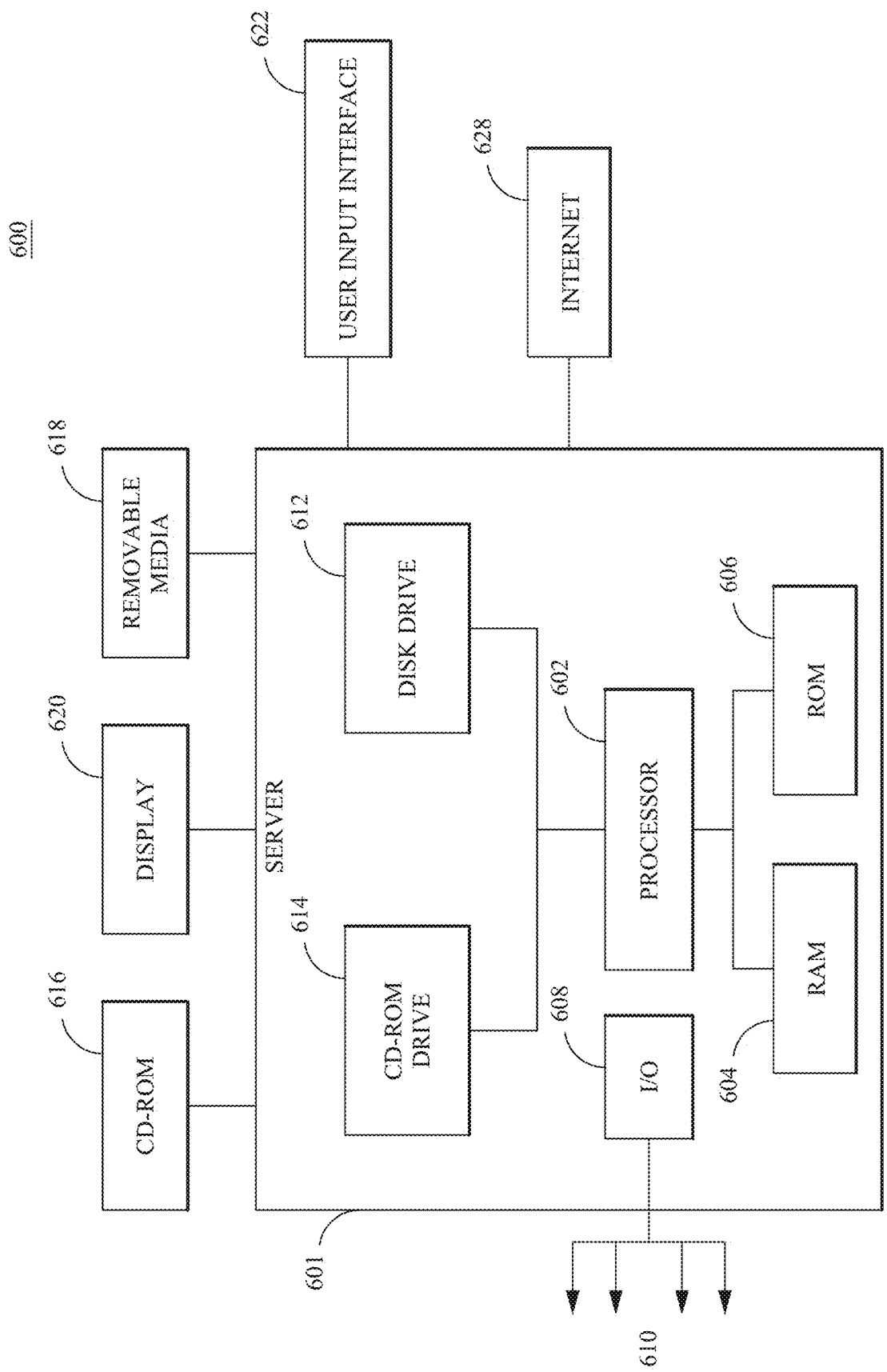
FIG. 6 is a schematic diagram of a data processing apparatus according to an embodiment.

The above-discussed methods may be implemented in a computing device 600 as illustrated in FIG. 6. Hardware, firmware, software or a combination thereof may be used to perform the various steps and operations described herein.

Exemplary computing device 600 suitable for performing the methods described in this section includes a server 601 with a central processor (CPU) 602 coupled to a random access memory (RAM) 604 and to a read-only memory (ROM) 606. Memory 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like. Processor 602 carries out a variety of functions as are known in the art, as dictated by software and/or firmware instructions.

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as sources, detectors, etc. The server may be part of a larger network configuration as in a global area network (GAN) such as the Internet 628, which allows ultimate connection to various computing devices.

The disclosed exemplary embodiments provide methods and devices for estimating surface wave coda of seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for estimating surface wave coda in seismic data recorded with a data acquisition system over an underground formation, the method comprising:

defining a first time-reversal mirror including a target source and one or more non-target sources of the data acquisition system, and a second time-reversal mirror including a target receiver and one or more non-target receivers of the data acquisition system;

using the first time-reversal mirror to simulate first time-reversal experiments on an input dataset representative for the seismic data, to obtain estimates of surface waves traveling from the non-target receivers to the target receiver;

muting each of the estimates and each surface wave trace from the target source to one of the non-target receivers in the second time-reversal mirror, up to a respective coda start time, to obtain a computed coda dataset; and using the second time-reversal mirror to simulate second time-reversal experiments on the computed coda dataset, to obtain a coda estimate for a surface wave travelling from the target source to the target receiver, wherein the coda estimate is then used to obtain information about a near-surface layer and/or removed coda from the seismic data before further processing to extract structural information about the underground formation.

2. The method of claim 1, wherein the target source, the target receiver, the non-target sources in the first time-reversal mirror and the non-target sources in the second time-reversal mirror correspond to sources and receivers of the data acquisition system.

3. The method of claim 1, further comprising:

obtaining the input dataset from the seismic data by muting data corresponding to seismic waves emerging from layer interfaces inside an explored underground formation.

4. The method of claim 1, further comprising:

selecting source-receiver pairs of the data acquisition system; and for each of the source-receiver pair performing the defining of the first time-reversal mirror and the second time-reversal mirror, the using of the first time-reversal mirror to simulate first time-reversal experiments, the muting, and the using of the second time-reversal mirror to simulate second time-reversal experiments, as the target source and the receiver source pertain to the source-receiver pair.

5. The method of claim 1, wherein the muting includes using distances between the target receiver and the non-target receivers and between the target source and the non-target receivers to calculate start coda times respectively, each of the estimates and each surface wave trace from the target source to the one of the non-target receivers being muted up to a respective one of the start coda times.

6. The method of claim 1, wherein each of the first time-reversal experiments includes correlating first surface waves from the non-target sources to one of the non-target receivers with second surface waves from the non-target sources to the target receiver, the first and the second surface waves being obtained from the input dataset.

7. The method of claim 1, wherein each of the second time-reversal experiments includes correlating third surface waves from the target source to the non-target receivers with estimates of surface waves traveling from the non-target receivers to the target receiver, respectively, the third surface waves and the estimates being obtained from the computed coda dataset.

8. A data processing apparatus configured to estimate surface wave coda in seismic data recorded with a data acquisition system over an underground formation, the apparatus comprising:
  an interface configured to obtain the seismic data; and
  a data processing unit connected to the interface and configured
    to define a first time-reversal mirror including a target source and one or more non-target sources, and a second time-reversal mirror including a target receiver and one or more non-target receivers,
    to use the first time-reversal mirror to simulate first time-reversal experiments on an input dataset representative for the seismic data, to obtain estimates of surface waves traveling from the non-target receivers to the target receiver,
    to mute each of the estimates and each surface wave trace from the target source to one of the non-target receivers in the second time-reversal mirror, up to a respective coda, to obtain computed coda dataset, and
    to use the second time-reversal mirror to simulate second time-reversal experiments on the computed coda dataset, to obtain a coda estimate for a surface wave travelling from the target source to the target receiver,
  wherein the coda estimate is then used to obtain information about a near-surface layer and/or removed coda from the seismic data before processing to extract structural information about the underground formation.

9. The data processing apparatus of claim 8, wherein the target source, the target receiver, the non-target sources in the first time-reversal mirror and the non-target sources in the second time-reversal mirror correspond to sources and receivers of the data acquisition system.

10. The data processing apparatus of claim 8, wherein the input dataset is obtained from seismic data acquired by the data acquisition system over an underground formation, by muting data corresponding to seismic waves emerging from layer interfaces inside the underground formation.

11. The data processing apparatus of claim 8, wherein the data processing unit is further configured:
  to select source-receiver pairs of the data acquisition system; and
  for each of the source-receiver pair, to perform defining the first time-reversal mirror and the second time-reversal mirror, using of the first time-reversal mirror to simulate first time-reversal experiments, muting the estimates of surface waves traveling from the non-target receivers to the target receiver and of the surface wave traces from the target source to one of the non-target receivers in the second time-reversal mirror, and using of the second time-reversal mirror to simulate second time-reversal experiments, as the target source and the receiver source pertain to the source-receiver pair.

12. The data processing apparatus of claim 8, wherein the data processing unit uses distances between the target receiver and the non-target receivers and between the target source and the non-target receivers to calculate start coda times respectively, each of the estimates and each surface wave trace from the target source to the one of the non-target receivers being muted up to a respective one of the start coda times.

13. The data processing apparatus of claim 8, wherein each of the first time-reversal experiments includes correlating first surface waves from the non-target sources to one of the non-target receivers with second surface waves from the non-target sources to the target receiver, the first and the second surface waves being obtained from the input dataset.

14. The data processing apparatus of claim 8, wherein each of the second time-reversal experiments includes correlating third surface waves from the target source to the non-target receivers with estimates of surface waves traveling from the non-target receivers to the target receiver, respectively, the third surface waves and the estimates being obtained from the computed coda dataset.

15. A non-transitory computer readable media storing executable codes which, when executed by a processor make the processor perform a method for estimating surface wave coda in seismic data recorded with a data acquisition system over an underground formation, the method comprising:
  defining a first time-reversal mirror including a target source and one or more non-target sources, and a second time-reversal mirror including a target receiver and one or more non-target receivers;
  using the first time-reversal mirror to simulate first time-reversal experiments on an input dataset representing seismic data acquired with the data acquisition system, to obtain estimates of surface waves traveling from the non-target receivers to the target receiver;
  muting each of the estimates and each surface wave trace from the target source to one of the non-target receivers in the second time-reversal mirror, up to a respective coda, to obtain computed coda dataset; and
  using the second time-reversal mirror to simulate second time-reversal experiments on the computed coda dataset, to obtain a coda estimate for a surface wave travelling from the target source to the target receiver,
  wherein the coda estimate is then used to obtain information about a near-surface layer and/or removed coda from the seismic data before processing to extract structural information about the underground formation.

16. The computer readable media of claim 15, wherein the target source, the target receiver, the non-target sources in the first time-reversal mirror and the non-target sources in the second time-reversal mirror correspond to sources and receivers of the data acquisition system.

17. The computer readable media of claim 15, further comprising:
  obtaining the input dataset from the seismic data by muting data corresponding to seismic waves emerging from deeper layers of an explored underground formation.

18. The computer readable media of claim 15, further comprising:
  selecting source-receiver pairs of the data acquisition system; and for each of the source-receiver pair performing the defining of the first time-reversal mirror and the second time-reversal mirror, the using of the first time-reversal mirror to simulate first time-reversal experiments, the muting, and the using of the second time-reversal mirror to simulate second time-reversal experiments, as the target source and the receiver source pertain to the source-receiver pair.

19. The computer readable media of claim 15, wherein the muting includes
using distances between the target receiver and the non-target receivers and between the target source and the non-target receivers to calculate start coda times respectively, each of the estimates and each surface wave trace from the target source to the one of the non-target receivers being muted up to a respective one of the start coda times.

20. The computer readable media of claim 15, wherein
each of the first time-reversal experiments includes correlating first surface waves from the non-target sources to one of the non-target receivers with second surface waves from the non-target sources to the target receiver, the first and the second surface waves being obtained from the input dataset, and/or
each of the second time-reversal experiments includes correlating third surface waves from the target source to the non-target receivers with estimates of surface waves traveling from the non-target receivers to the target receiver, respectively, the third surface waves and the estimates being obtained from the computed coda dataset.

* * * * *